US012465278B2

(12) United States Patent
Emaminejad

(10) Patent No.: US 12,465,278 B2
(45) Date of Patent: Nov. 11, 2025

(54) MULTIPLEXED SWEAT EXTRACTION AND SENSING WEARABLE DEVICE FOR NORMALIZED AND TIME-SEQUENTIAL SWEAT ANALYSIS

(71) Applicant: THE REGENTS OF THE UNIVERSITY OF CALIFORNIA, Oakland, CA (US)

(72) Inventor: Sam Emaminejad, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1258 days.

(21) Appl. No.: 16/644,125

(22) PCT Filed: Sep. 6, 2018

(86) PCT No.: PCT/US2018/049779
§ 371 (c)(1),
(2) Date: Mar. 3, 2020

(87) PCT Pub. No.: WO2019/051107
PCT Pub. Date: Mar. 14, 2019

(65) Prior Publication Data
US 2020/0205721 A1 Jul. 2, 2020

Related U.S. Application Data

(60) Provisional application No. 62/555,537, filed on Sep. 7, 2017.

(51) Int. Cl.
*A61B 5/00* (2006.01)
*A61B 5/145* (2006.01)
*A61B 5/1477* (2006.01)

(52) U.S. Cl.
CPC ........ *A61B 5/4266* (2013.01); *A61B 5/14521* (2013.01); *A61B 5/1477* (2013.01); *A61B 5/7228* (2013.01); *A61B 2560/0223* (2013.01)

(58) Field of Classification Search
CPC combination set(s) only.
See application file for complete search history.

(56) References Cited

U.S. PATENT DOCUMENTS 5,817,012 A * 10/1998 Schoendorfer .... A61B 10/0035
600/362
9,597,038 B2 3/2017 Schwiening
(Continued)

FOREIGN PATENT DOCUMENTS

EP 0 299 615 A2 1/1989
EP 0 942 278 A2 9/1999
(Continued)

OTHER PUBLICATIONS

Gao et al., (Fully integrated wearable sensor arrays for multiplexed in situ perspiration analysis, Nature, vol. 529, pp. 509-514 (Year: 2016).*
(Continued)

*Primary Examiner* — Jacqueline Cheng
*Assistant Examiner* — Tho Q Tran
(74) *Attorney, Agent, or Firm* — Foley & Lardner LLP

(57) ABSTRACT

A wearable device for multiplexed sweat analysis includes a sensing module. The sensing module includes multiple compartments, including a first compartment configured to induce sweat and sense a target analyte, and a second compartment configured to induce sweat and sense the target analyte.

19 Claims, 2 Drawing Sheets

(56) References Cited

U.S. PATENT DOCUMENTS

| | | | |
|---|---|---|---|
| 2004/0040868 A1 | 3/2004 | Denuzzio et al. | |
| 2004/0096959 A1* | 5/2004 | Stiene | A61B 5/150755 435/287.2 |
| 2006/0004271 A1* | 1/2006 | Peyser | A61B 5/14532 600/362 |
| 2007/0078445 A1* | 4/2007 | Malloy | A61N 1/37288 604/890.1 |
| 2015/0112164 A1* | 4/2015 | Heikenfeld | A61B 10/0064 600/584 |
| 2016/0007893 A1 | 1/2016 | Roberts | |
| 2016/0287148 A1* | 10/2016 | Pizer | A61B 5/14546 |
| 2018/0146898 A1* | 5/2018 | Begtrup | A61B 5/02405 |
| 2019/0082999 A1* | 3/2019 | Heikenfeld | A61B 5/7221 |

FOREIGN PATENT DOCUMENTS

| | | |
|---|---|---|
| WO | WO-2015/058055 A1 | 4/2015 |
| WO | WO-2016/090189 A1 | 6/2016 |
| WO | WO-2016/134235 A1 | 8/2016 |

OTHER PUBLICATIONS

TI CC2541 specification sheet (rev Jun. 2013). (Year: 2013).*

International Search Report and Written Opinion, dated Nov. 5, 2018, issued in International Application No. PCT/US2018/049779 (9 pages).

Emaminejad, et al., "Autonomous sweat extraction and analysis applied to cystic fibrosis and glucose monitoring using a fully integrated wearable platform", Proc. Nat. Acad. Sci. 114(18): (2017) pp. 4625-4630.

Extended European Search Report on EP 18852854.1 dated Apr. 9, 2021.

International Preliminary Report on Patentability on PCT/US2018/049779 dated Mar. 19, 2020.

H. Lee et al., "A graphene-based electrochemical device with thermoresponsive microneedles for diabetes monitoring and therapy," Nature Nanotechnology, V11, Jun. 2016, pp. 566-574.

H. Nyein et al., "A Wearable Electrochemical Platform for Noninvasive Simultaneous Monitoring of Ca2 and pH," ACS Nano 2016, V10, Jul. 5, 2016, pp. 7216-7224.

J. Kim et al., "Noninvasive Alcohol Monitoring Using a Wearable Tattoo-Based Iontophoretic-Biosensing System," ACS Sensors 2016, Jul. 12, 2016, pp. 1011-1019.

J. Kim et al., "Wearable non-invasive epidermal glucose sensors: A review," Talanta, Aug. 25, 2017, 8pgs.

M. McCaul et al., "Challenges and opportunities in wearable technology for biochemical analysis in sweat," Current Opinion in Electrochemistry, 2017, 5pgs.

W. Gao et al., "Wearable Microsensor Array for Multiplexed Heaving Metal Monitoring of Body Fluids," ACS Sensors 2016, May 9, 2016, pp. 866-874.

\* cited by examiner

MULTIPLEXED SWEAT EXTRACTION AND SENSING WEARABLE DEVICE FOR NORMALIZED AND TIME-SEQUENTIAL SWEAT ANALYSIS

CROSS-REFERENCE TO RELATED APPLICATION

This application is a National Stage Entry of International Application No. PCT/US2018/049779, filed Sep. 6, 2018, which claims the benefit of U.S. Provisional Application No. 62/555,537, filed Sep. 7, 2017, the contents of which are incorporated herein by reference in their entirety.

TECHNICAL FIELD

This disclosure generally relates to devices for sweat analysis.

BACKGROUND

Recent advances in electrochemical sensor development, flexible device fabrication and integration technologies, and low-power electronics have prompted the development of wearable sweat sensors. Some wearable sweat sensors have demonstrated the in-situ sensing of various sweat analytes. However, such sensors lacked the ability to induce sweat on-demand. The inaccessibility of sweat in sedentary individuals and lack of control of the secretion process impede the exploitation of the benefits associated with the non-invasive modality of sweat analysis. Further, such sensors lacked the ability to perform normalized and periodic analysis.

It is against this background that a need arose to develop the embodiments described herein.

SUMMARY

In some embodiments, a wearable device for multiplexed sweat analysis includes a sensing module. The sensing module includes multiple compartments, including a first compartment configured to induce sweat and sense a target analyte, and a second compartment configured to induce sweat and sense the target analyte.

In some embodiments, a wearable device for multiplexed sweat analysis includes: (1) a first sensing region including a first pair of iontophoresis electrodes and a first secretory agonist-containing hydrogel layer adjacent to the first pair of iontophoresis electrodes, and a first sensor configured to sense a target analyte; (2) a second sensing region including a second pair of iontophoresis electrodes and a second secretory agonist-containing hydrogel layer adjacent to the second pair of iontophoresis electrodes, and a second sensor configured to sense the target analyte; and (3) a processor connected to the first sensing region and the second sensing region.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Embodiments of this disclosure are directed to a wearable device for multiplexed sweat analysis. In some embodiments, the wearable device includes a multiplexed sensing module, which includes multiple (two or more, such as three, four, five, six, seven, eight, or more) sensing compartments. Each sensing compartment includes iontophoresis electrodes/hydrogel layer for sweat induction, an array of one or more sweat analyte sensors, and one or more calibrating sensors, such as one or more of a pH sensor, a skin temperature sensor, and a sweat rate sensor. Through activating the iontophoresis functionality in each sensing compartment selectively, a secretory agonist in a hydrogel layer is delivered to sweat glands of an individual to stimulate sweat secretion. The sensing module can be configured to operate in a parallel mode, a time-activated sequential mode, or a combination of the two modes. In a parallel mode, multiple ones (e.g., a subset or all) of the sensing compartments are concurrently activated to perform sweat extraction and analysis. By setting a respective and different iontophoresis electrical current for each sensing compartment, modulation of secretion rates can be performed across multiple sensing compartments under different conditions, and respective analyte sweat profiles can be analyzed for each condition. This multi-conditional array of measurements allows for normalization of sweat analyte measurements with respect to the multi-conditionally induced secretion rates. Furthermore, through operating the sensing module in a time-activated sequential mode, each sensing compartment is activated, one at a time and with a fixed or variable time interval (e.g., 3 hours) between activations, to perform time-sequential (e.g., periodic) sweat analyte measurements over the course of a day or 24 hours. This sequential mode allows capturing the temporal baseline and variability levels of a sweat analyte in the form of a time profile. A combination of these two modes can also be performed for normalized measurements longitudinally. The sensing module interfaces a wireless circuit board. The circuit board includes integrated circuitry (e.g., one or more chips) and other electronic devices to realize iontophoresis, signal conditioning (e.g., analog/digital signal processing), control (e.g., for setting iontophoresis currents and multiplexing), and wireless communication functionalities, thus providing a fully integrated and programmable platform.

Figure 1:
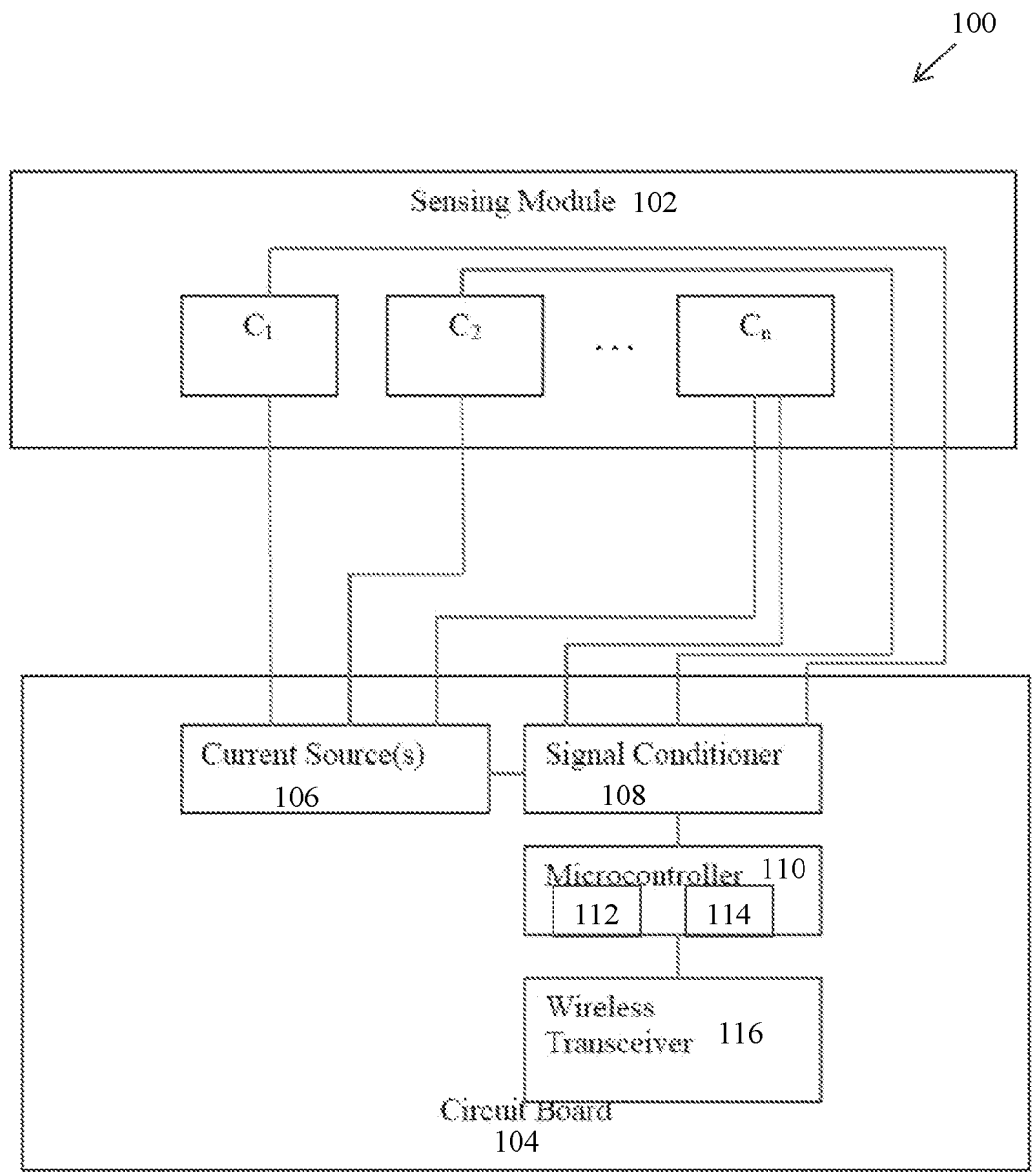
FIG. 1 is a schematic illustration of a wearable device for multiplexed sweat analysis according to some embodiments.

FIG. 1 is a schematic illustration of a wearable device 100 for multiplexed sweat analysis according to some embodiments. The wearable device 100 includes a multiplexed sensing module 102 and a circuit board 104, where the sensing module 102 interfaces with the circuit board 104 through electrical connections. The sensing module includes multiple sensing compartments $C_1, C_2 \ldots$ through $C_n$. For example, n can be eight, although, in general, two or more sensing compartments can be included in the sensing module. The sensing compartments $C_1, C_2 \ldots$ through $C_n$ can be adjacent to one another, and can be respective sensing regions integrated on a common substrate.

Figure 2:
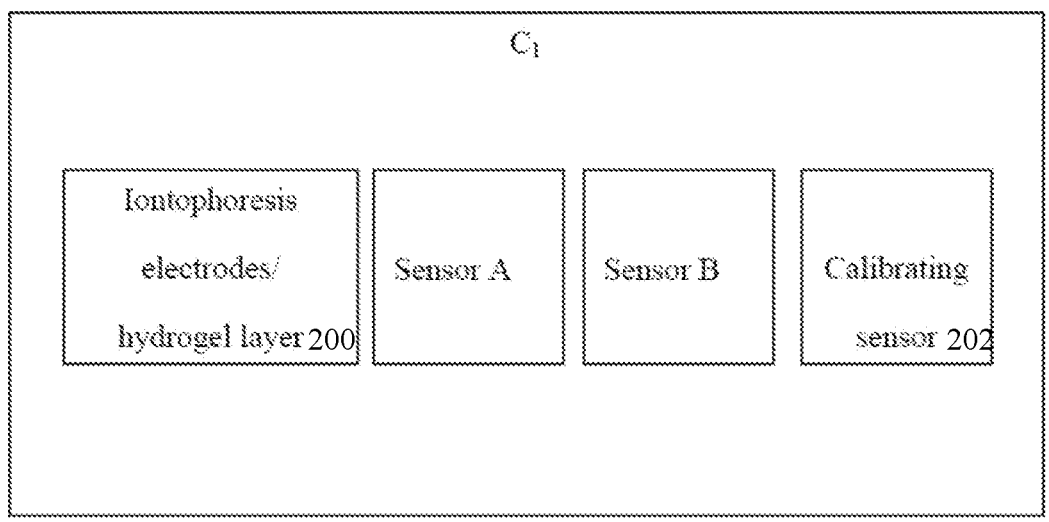
FIG. 2 is a schematic illustration of a sensing compartment $C_1$ according to some embodiments.

FIG. 2 is a schematic illustration of the sensing compartment $C_1$ according to some embodiments. Remaining sensing compartments $C_2 \ldots$ through $C_n$ can be similarly implemented as illustrated in FIG. 2. The sensing compartment $C_1$ includes a pair of iontophoresis electrodes/hydrogel layer 200 for sweat induction, an array of sweat analyte sensors A and B, and a calibrating sensor 202. The hydrogel layer is adjacent to the iontophoresis electrodes, and the iontophoresis electrodes are configured to interface a skin with the hydrogel layer in between. The hydrogel layer includes a secretory agonist (e.g., a cholinergic sweat gland secretory stimulating compound, such as pilocarpine), which is released when an electrical current is applied to the iontophoresis electrodes. Each of sensors A and B includes a sensing layer and a sensing electrode adjacent to the sensing layer. The sensors A and B are configured to sense respective and different analytes, by generating sensing signals responsive to presence or levels of such analytes in induced sweat. For example, analytes can be selected from metabolites, electrolytes, proteins, and heavy metals. For example, the sensors A and B can be different sensors selected from a glucose sensor including an enzyme in a sensing layer (e.g., glucose oxidase), a lactate sensor including an enzyme in a sensing layer (e.g., lactate oxidase), a $Na^+$ sensor, a $Cl^-$ sensor, and $Ca^{2+}$ sensor. Although the two sensors A and B are illustrated in FIG. 2, in general, one or more sensors can be included in the sensing compartment $C_1$. The calibration sensor 202 can be a pH sensor, a skin temperature sensor, or a sweat rate sensor, which generates a calibration signal responsive to a pH, a temperature, or a sweat rate of a skin such that responses of the sensors A and B can be adjusted or calibrated according to such calibration signal. Although the one calibration sensor 202 is illustrated in FIG. 2, in general, one or more calibration sensors can be included in the sensing compartment $C_1$.

Referring back to FIG. 1, the circuit board 104 includes one or more current sources 106, which are connected to the sensing compartments $C_1$, $C_2$ . . . through $C_n$ to activate sweat induction. In some embodiments, multiples current sources 106 are included, and each current source 106 is connected to a respective one of the sensing compartments $C_1$, $C_2$ . . . through $C_n$. A signal conditioner 108 is also included in the circuit board 104, and can include signal processing circuitry such as one or more analog-to-digital converters, one or more digital-to-analog converters, and one or more filters. A microcontroller 110, which includes a processor 112 and an associated memory 114 storing processor-executable instructions, is also included in the circuit board 104, and is configured to control operation of various components of the sensing module 102 and the circuit board 104. In particular, the processor 112 is configured to direct multiplexed operation of the sensing compartments $C_1$, $C_2$ . . . through $C_n$, through control of the current sources 106 and the signal conditioner 108, and to concurrently activate multiple ones of the sensing compartments $C_1$, $C_2$ . . . through $C_n$ according to a parallel mode, sequentially activate the sensing compartments $C_1$, $C_2$ . . . through $C_n$ according to a time-activated sequential mode, or a combination of the two modes. In addition, the processor 112 is configured to adjust or calibrate responses of the sensors A and B according to a calibration signal from the calibration sensor 202, and to derive analyte measurements according to the calibrated responses. A wireless transceiver 116 is also included in the circuit board 104 to allow wireless communication between the wearable device 100 and an external electronic device, such as a portable electronic device or a remote computing device.

As noted above, a wearable device according to some embodiments can be configured to operate in a parallel mode, a time-activated sequential mode, or a combination of the two modes. The following further explains operation in a parallel mode. A concentration of an analyte secreted in sweat can be dependent upon a secretion rate. Since the secretion rate can vary across individuals when subjected to a same or similar sweat induction condition, it is desired to decouple the effect of the secretion rate from a measured concentration of a secreted analyte. For example, a linear model can be used to represent a relationship between a target analyte's concentrations in sweat $[M]_{S,i}$ and blood $[M]_{B,i}$ as denoted below:

$$[M]_{S,i} = a(Q_i)[M]_{B,i} + b(Q_i) + \varepsilon_i$$

where i denotes a particular sweat induction condition that resulted in a secretion rate $Q_i$, $a(Q_i)$ and $b(Q_i)$ are related to secretion accumulation and gland contribution, respectively, and are functions (e.g., linear functions) of the secretion rate $Q_i$ according to secretion parameters (which can vary across individuals), and $\varepsilon_i$ is a non-secretion parameter capturing a confounding effect (which can vary across individuals). For example, $a(Q_i)$ can be represented as $a_1 Q_i + a_2$, and $b(Q_i)$ can be represented as $b_1 Q_i + b_2$. The target analyte's concentration in blood $[M]_{B,i}$ also can be represented as $[M]_B$, if independent of sweat induction condition. By performing a multiple number of multi-conditional measurements equal to or greater than a number of unknowns in the linear model, the secretion and non-secretion parameters can be derived, and the effect of the secretion rate and the confounding effect can be decoupled from measurements of the target analyte's concentration in sweat to derive normalized measurements of the target analyte that are reflective of blood levels. Although a linear model is explained above, a non-linear model also can be used to represent relationship between the target analyte's concentrations in sweat and blood.

Embodiments of a wearable device advance personalized medicine by allowing on-demand and non-invasive monitoring of individuals. By extracting sweat through the use of iontophoresis, the wearable device provides access to a rich source of physiological information (e.g., in sedentary individuals and in the context of in-situ sensing), available for on-demand sweat analysis. By using sweat sensing for physiological monitoring, an improved diagnostic platform is provided, with real-time information sensing and transmission capabilities, and which is scalable and can be used to facilitate large-scale clinical investigations, remote patient monitoring, disease prevention/management, pharmaceutical monitoring, and patient performance monitoring.

The following are example embodiments of this disclosure.

First Aspect

In some embodiments according to a first aspect, a wearable device for multiplexed sweat analysis includes a sensing module. The sensing module includes multiple compartments, including a first compartment configured to induce sweat and sense a target analyte, and a second compartment configured to induce sweat and sense the target analyte.

In some embodiments, the first compartment includes a first pair of iontophoresis electrodes and a first secretory agonist-containing hydrogel layer adjacent to the first pair of iontophoresis electrodes, and a first sensor configured to sense the target analyte.

In some embodiments, the first compartment further includes a first calibration sensor.

In some embodiments, the second compartment includes a second pair of iontophoresis electrodes and a second secretory agonist-containing hydrogel layer adjacent to the second pair of iontophoresis electrodes, and a second sensor configured to sense the target analyte.

In some embodiments, the second compartment further includes a second calibration sensor.

In some embodiments, the wearable device further includes a processor connected to the compartments to direct multiplexed operation of the compartments.

In some embodiments, the processor is configured to concurrently activate multiple ones of the compartments under respective and different sweat induction conditions.

In some embodiments, the processor is configured to derive multiple measurements of a sweat level of the target analyte from sensing signals of the concurrently activated compartments under the different conditions, and to derive a normalized measurement of a blood level of the target analyte from the multiple measurements of the sweat level of the target analyte.

In some embodiments, the processor is configured to sequentially activate respective ones of the compartments over time.

In some embodiments, the processor is configured to derive a time profile of the target analyte.

Second Aspect

In some embodiments according to a second aspect, a wearable device for multiplexed sweat analysis includes: (1) a first sensing region including a first pair of iontophoresis electrodes and a first secretory agonist-containing hydrogel layer adjacent to the first pair of iontophoresis electrodes, and a first sensor configured to sense a target analyte; (2) a second sensing region including a second pair of iontophoresis electrodes and a second secretory agonist-containing hydrogel layer adjacent to the second pair of iontophoresis electrodes, and a second sensor configured to sense the target analyte; and (3) a processor connected to the first sensing region and the second sensing region.

In some embodiments, the processor is configured to activate the first sensing region and the second sensing region under respective and different sweat induction conditions.

In some embodiments, the processor is configured to derive multiple measurements of a sweat level of the target analyte from sensing signals of the first sensing region and the second sensing region under the different conditions, and to derive a normalized measurement of a blood level of the target analyte from the multiple measurements of the sweat level of the target analyte.

In some embodiments, the processor is configured to sequentially activate the first sensing region and the second sensing region over time.

In some embodiments, the processor is configured to derive a time profile of the target analyte.

Third Aspect

In some embodiments according to a third aspect, a method includes: (1) activating multiple sensing regions under respective and different sweat induction conditions; (2) deriving multiple measurements of a sweat level of a target analyte from sensing signals of the sensing regions under the different conditions; and (3) deriving a normalized measurement of a blood level of the target analyte from the multiple measurements of the sweat level of the target analyte.

Fourth Aspect

In some embodiments according to a fourth aspect, a method includes: (1) sequentially activating respective ones of multiple sensing regions over time; (2) deriving multiple measurements of a sweat level of a target analyte from sensing signals of the sensing regions over time; and (3) deriving a time profile of the target analyte from the multiple measurements of the sweat level of the target analyte over time.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

Some embodiments of this disclosure relate to a non-transitory computer-readable storage medium having computer code or instructions thereon for performing various processor-implemented operations. The term "computer-readable storage medium" is used to include any medium that is capable of storing or encoding a sequence of instructions or computer code for performing the operations, methodologies, and techniques described herein. The media and computer code may be those specially designed and constructed for the purposes of the embodiments of the disclosure, or they may be of the kind available to those having skill in the computer software arts. Examples of computer-readable storage media include volatile and non-volatile memory for storing information. Examples of memory include semiconductor memory devices such as erasable programmable read-only memory (EPROM), electrically erasable programmable read-only memory (EEPROM), random-access memory (RAM), and flash memory devices, discs such as internal hard drives, removable hard drives, magneto-optical, compact disc (CD), digital versatile disc (DVD), and Blu-ray discs, memory sticks, and the like. Examples of computer code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computing device via a transmission channel. Another embodiment of the disclosure may be implemented in hardwired circuitry in place of, or in combination with, processor-executable software instructions.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A wearable device for sweat analysis, comprising:
   a sensing module including multiple compartments, including:
      a first compartment configured to induce sweat and sense a first level of a target analyte in the sweat induced by the first compartment; and
      a second compartment configured to induce sweat and sense a second level of the target analyte in the sweat induced by the second compartment;
   a current source respectively coupled to provide current to the first and second compartments;
   a signal conditioner coupled between the current source and the first and second compartments, wherein the signal conditioner is configured to condition the current from the current source so as to provide first and second respective different currents to the first and second compartments in accordance with first and second respective different sweat secretion rates; and
   a processor configured to derive a measurement of a blood level of the target analyte from multiple sweat measurements comprising multiple ones of the sensed first and second levels of the target analyte obtained from the first and second compartments,
   wherein the processor is configured to derive the blood level of the target analyte from the multiple sweat measurements of the target analyte using a model of a relationship between the blood level of the target analyte and a sweat level of the target analyte under a plurality of sweat induction conditions.

2. The wearable device of claim 1, wherein:
   the first compartment includes:
      a first pair of iontophoresis electrodes and a first secretory agonist-containing hydrogel layer adjacent to the first pair of iontophoresis electrodes; and
      a first sensor configured to sense the target analyte.

3. The wearable device of claim 2, wherein the first compartment further includes a first calibration sensor.

4. The wearable device of claim 3, wherein:
   the second compartment includes:
      a second pair of iontophoresis electrodes and a second secretory agonist-containing hydrogel layer adjacent to the second pair of iontophoresis electrodes; and
      a second sensor configured to sense the target analyte.

5. The wearable device of claim 4, wherein the second compartment further includes a second calibration sensor.

6. The wearable device of claim 5, further comprising:
   the processor connected to the compartments to direct multiplexed operation of the compartments.

7. The wearable device of claim 6, wherein the processor is configured to concurrently activate multiple ones of the compartments under respective and different sweat induction conditions.

8. The wearable device of claim 7, wherein the processor is configured to derive the multiple measurements of a sweat level of the target analyte from sensing signals of the concurrently activated compartments under the different conditions, and to derive a normalized measurement of the blood level of the target analyte from the multiple measurements of the sweat level of the target analyte.

9. The wearable device of claim 6, wherein the processor is configured to sequentially activate the compartments over time.

10. The wearable device of claim 9, wherein the processor is configured to derive a time profile of the target analyte.

11. A wearable device for sweat analysis, comprising:
    a first sensing region including
       a first pair of iontophoresis electrodes and a first secretory agonist-containing hydrogel layer adjacent to the first pair of iontophoresis electrodes; and
       a first sensor configured to sense a first level of a target analyte in sweat induced in the first sensing region;
    a second sensing region including
       a second pair of iontophoresis electrodes and a second secretory agonist-containing hydrogel layer adjacent to the second pair of iontophoresis electrodes; and
       a second sensor configured to sense a second level of the target analyte in sweat induced in the second sensing region;
    a current source respectively coupled to provide current to the first and second sensing regions;
    a signal conditioner coupled between the current source and the first and second sensing regions, wherein the signal conditioner is configured to condition the current from the current source so as to provide first and second different currents to the first and second sensing regions in accordance with respective first and second different sweat secretion rates; and
    a processor connected to the first sensing region and the second sensing region, wherein the processor is configured to derive a measurement of a blood level of the target analyte from multiple sweat measurements comprising multiple ones of the sensed first and second levels of the target analyte obtained from the first and second sensing regions, wherein the processor is configured to derive the blood level of the target analyte from the multiple sweat measurements of the target analyte using a model of a relationship between the blood level of the target analyte and a sweat level of the target analyte under a plurality of sweat induction conditions.

12. The wearable device of claim 11, wherein the processor is configured to activate the first sensing region and the second sensing region under respective and different sweat induction conditions.

13. The wearable device of claim 12, wherein the processor is configured to derive the multiple measurements of a sweat level of the target analyte from sensing signals of the first sensing region and the second sensing region under the different conditions, and to derive a normalized measurement of the blood level of the target analyte from the multiple measurements of the sweat level of the target analyte.

14. The wearable device of claim 11, wherein the processor is configured to sequentially activate the first sensing region and the second sensing region over time.

15. The wearable device of claim 14, wherein the processor is configured to derive a time profile of the target analyte.

16. The wearable device of claim 1, wherein the current source and signal conditioner are configured to cause the first and second respective different currents to be concurrently provided to the first and second compartments.

17. The wearable device of claim 11, wherein the current source and signal conditioner are configured to cause the first and second respective different currents to be concurrently provided to the first and second sensing regions.

18. The wearable device of claim 16, wherein the first and second different currents are adjusted to normalize sweat secretion for the first and second compartments according to first and second different sweat induction conditions concurrently associated with the first and second compartments.

19. The wearable device of claim 1, wherein the model is a linear model.

* * * * *